United States Patent [19]
Rohner

[11] Patent Number: 6,064,392
[45] Date of Patent: May 16, 2000

[54] METHOD AND APPARATUS FOR GENERATING NON-HOMOGENOUS FOG

[75] Inventor: Michel A. Rohner, San Jose, Calif.

[73] Assignee: Oak Technology, Inc., Sunnyvale, Calif.

[21] Appl. No.: 09/042,595

[22] Filed: Mar. 16, 1998

[51] Int. Cl.$^7$ .................................................. G06T 15/60
[52] U.S. Cl. ........................ 345/426; 345/431; 345/432
[58] Field of Search .................................... 345/426, 431, 345/432

[56] References Cited

U.S. PATENT DOCUMENTS

| | | | |
|---|---|---|---|
| 5,363,475 | 11/1994 | Baker et al. | 395/122 |
| 5,412,796 | 5/1995 | Olive | 395/500 |
| 5,535,374 | 7/1996 | Olive | 395/500 |

OTHER PUBLICATIONS

Open GL 1.1 Webpage reference, Jan. 28, 1998.
Schumacker et al., "Low Visibility Effects for Computer–enerated Image Systems", SID Symposium, pp. 70–71, May 1971.
Neider et al., "OpenGL Programming Guide, The Official Guide to Learning OpenGL, Release 1", Open GL Architecture Review Board, pp. 216–223, Aug. 1994.

*Primary Examiner*—Mark R. Powell
*Assistant Examiner*—Motilewa Good-Johnson
*Attorney, Agent, or Firm*—Steven F. Caserza; Flehr Hohbach Test Albritton & Herbert

[57] ABSTRACT

The present invention simulates the effect of non-homogenous fog in computer graphics images. The non-homogenous fog visibility equation includes four parameters. A distance scaling parameter K1. A variable fog parameter K2. A normalization constant K3, and a scaling constant K4. The visibility at a sample point can be determined using the visibility equation:

$$V(Z_{ns}) = e^{K3 - \frac{K4}{Z_{ns}}}$$

where $Z_{ns}$ is a normalized and scaled image distance which is equal to $(K4*K1*Z)+(K4*K2)$. To improve computational efficiency the visibility function can be evaluated using a lookup table. The lookup table of the present invention has an efficient addressing scheme and a minimum number of output steps. The visibility function can be expressed as a function of a fog ratio and a fog distance. The fog distance is a distance from the viewpoint to the point where the visibility is reduced to 37% of full visibility. The fog ratio is the square root of the ratio of "near fog" density to "far fog" density. The visibility function expressed as a function of fog ratio and fog distance is $$V(Z) = e^{-\frac{1}{(fog\_ratio * fog\_distance * Z) + 1 - fog\_ratio}}$$

4 Claims, 9 Drawing Sheets

METHOD AND APPARATUS FOR GENERATING NON-HOMOGENOUS FOG

This invention pertains to computer graphics, and more particularly to a system for simulating the effect of fog, having a density that varies over distance, in computer graphics images.

BACKGROUND

Computer-generated image systems can provide dynamic, real-time, computer graphics images to simulate the three dimensional visual field from a moving vehicle, such as an airplane or car. In computer graphics systems, a three dimensional object is typically modeled using a collection of two dimensional polygons that cover the three dimensional surface of the object. The color, texture and lighting of each pixel on each visible surface is computed based on the relative position and orientation of the object containing the pixel to the viewpoint.

For flight simulation applications, and other outdoor graphics applications, it is often important to simulate the effects of fog or haze. Fog effects are particularly important in simulating aircraft approach and landing situations. The fog effect is typically implemented by generating a visibility value, V. The visibility value has a range between zero and one. The visibility value is used to mix the object color with the fog color. For a point on an object surface, the visibility value specifies how to mix the color of the point on the object with the color of the fog to obtain the color of the point on the image according to the equation $$\text{color(image)} = V*\text{color(object)} + (1-V)*\text{color(fog)}.$$

Conventional methods of simulating fog effects include providing a uniform density fog which results in an exponential visibility function, and generating fog effects based on a fog density function that varies as a function of distance. Three widely known fog modes are: linear fog, exponential fog, and exponential squared fog. The fog effect increases and visibility decreases with distance, D. In a linear fog mode, a start point and an end point are defined for the fog effect. The fog effect begins at the defined starting point and increases linearly until it reaches its maximum density at the defined end point. The following is a formula for a linear fog mode:

$$V(D) = \frac{end - D}{end - start}$$

Exponential fog modes begin with a barely visible fog effect and increase to the maximum density along an exponential curve. The following is the formula for the exponential fog mode:

$$V(D) = e^{-density*D}$$

In the exponential squared fog mode, the fog effect increasese more quickly than in the exponential fog mode. The following is the formula for the exponential squared fog mode:

$$V(D) = e^{-(density*D)^2}$$

These fog modes are supported in Microsoft's Direct3D™ application programming interface (API) and in Silicon Graphics OpenGL API. These approaches require three different implementations of fog as a function of distance. There is therefore a need for an approach to generating a wide range of fog curves using a single fog function.

SUMMARY

The present invention provides realistic non-homogenous fog effects in computer graphics images with a minimum amount of hardware. In one embodiment, first a fog distance is defined. The fog distance is a distance from the viewpoint to the point where the visibility is reduced to 37% of full visibility. A fog ratio is then defined. The fog ratio is the square root of the ratio of "near fog" density to "far fog" density. Next, sample points are selected, and the distance from each sample point to the viewpoint is determined. The visibility at this sample point is determined using one of the visibility equations described below. Visibility values can be determined using a lookup table to improve computational efficiency.

The lookup table of the present invention has an efficient addressing scheme and a minimum number of output steps. The table is applied for a limited range of image distance values. Near the viewpoint, before the starting range of the visibility function, the visibility is one, corresponding to a complete absence of fog effect. Beyond the end of the visibility range, the visibility is zero, corresponding to a fully fogged condition. Between these two ranges the visibility function is applied. A selection of bits from the floating point representation of the normalized image distance value is used for efficient table addressing. This efficient addressing system also serves to limit the deltas or visibility steps at the output of the table.

With non-homogenous fog, the visibility decreases with distance, but is contained within two curves. The first curve is the near visibility function. The near visibility function is the visibility function for homogenous fog using the fog density near the viewpoint. The second curve is the far visibility function. The far visibility function is the visibility function for homogenous fog using the fog density at the fog distance. The visibility function for non-homogenous fog behaves like the near visibility function near the observer, and like the far visibility function beyond the fog distance. The non-homogenous fog function is of the form $$V(Z) = e^{\frac{-1}{(K1*Z)+K2}}$$

The visibility function can also be expressed as a function of the fog ratio and the fog distance as $$V(Z) = e^{-\frac{1}{(fog\_ratio*fog\_distance*Z)+1-fog\_ratio}}$$

where $K1 = fog\_ratio * fog\_distance$ $K2 = 1 - fog\_ratio$

The variable Z is the projected coordinate depth. $Z = 1/D$, where D is a distance in world coordinates from the viewpoint to a point on the object. Z is linear in image space $(X, Y, Z)_{image}$. For homogenous fog K2 is zero.

In order to limit the range of the function, a third parameter, K3, is introduced into the non-homogenous fog function. The non-homogenous fog function with the K3 parameter is $$V(Z) = e^{K3 - \frac{1}{(K1*Z)+K2}}$$

To optimize the visibility lookup table, a fourth parameter, K4, is introduced into the non-homogenous fog function. The non-homogenous fog function with the K4 parameter is $$V(Z) = e^{K3 - \frac{1}{(K4*K1*Z)+(K4+K2)}}$$

In one embodiment, all of the fog conditions are represented by a single visibility function of a normalized and scaled image distance, $Z_{ns}$. $Z_{ns}$ represents the lookup table address. The normalized visibility function is $$V(Z_{ns}) = e^{K3 - \frac{K4}{Z_{ns}}}$$

where $$Z_{ns} = (K4*K1*Z)+(K4*K2)$$

The present invention variable fog function may also be used to generate good approximations of linear fog functions and exponential squared fog functions.

DETAILED DESCRIPTION OF THE PREFERRED EMBODIMENTS

Figure 1:
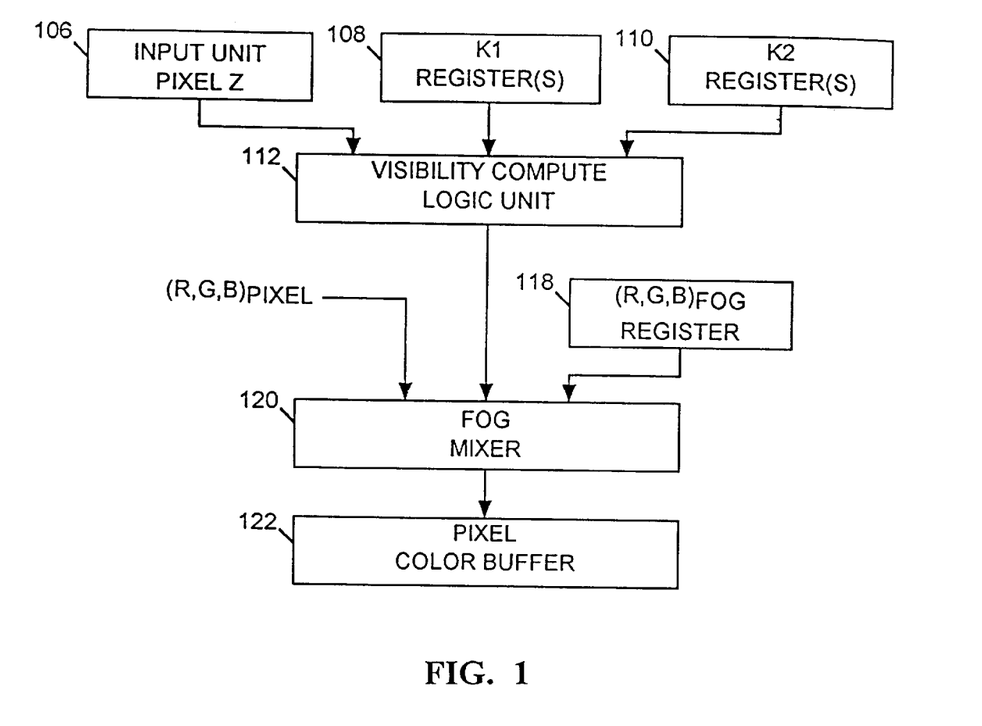
FIG. 1 illustrates a block diagram of the variable fog generator hardware modules according to one embodiment of the present invention.

FIG. 1 illustrates a block diagram of the variable fog generator hardware modules according to one embodiment of the present invention. A flow chart overview of a method for generating variable fog is illustrated in FIG. 3. The method describes generating a fog value for a pixel. Alternatively, fog values can be computed for any point on a polygon, including for example, computing fog values at each vertex of a polygon. Two parameters, K1 and K2, of the variable fog generation method are stored in control registers 108 and 110. The values of K1 and K2, as well as the depth value, Z, at the pixel are provided as inputs to visibility compute logic unit 112. Visibility compute logic unit 112 computes the visibility value for the processed polygon at each covered pixel. The visibility computations use a parametric description of the fog distribution defined by the two parameters K1 and K2. The values of K1 and K2 are a function of the fog density and the fog distribution. K1 and K2 are constant for polygons processed with the same fog effect. In one embodiment, multiple pairs of K1 and K2 values are used to achieve different fog effects for different types of polygons. For example, lights have a larger visibility through fog than non-light emitting objects. A different pair of K1 and K2 values can be used for point lights or other glowing objects. In this embodiment, the K1 and K2 registers, in FIG. 1, can store several pairs of K1 and K2 values. Visibility compute logic unit 112 computes the visibility of a polygon surface at each pixel. The operation of the visibility compute logic unit 112 module is described in more detail in conjunction with FIG. 2. The visibility values for the pixels covered by the polygon surface are provided to the fog mixer 120 module along with the RGB values for the pixel.

The fog mixer 120 module uses the visibility values from visibility compute logic unit 112, the pixel color (R,G,B)$_{polygon}$ values from a module not shown, and the background color (R,G,B)$_{fog}$ values from fog register 118. In one embodiment fog register 118 is a 16 bit register with a (5,6,5) register format. In an alternative embodiment a 24 bit fog register 118 is used with an (8,8,8) register format. Fog register 118 can be updated at the beginning of a new frame. Fog mixer 120 computes the fogged color for the pixels covered by the polygon. The fogged color (R,G,B)$_{mix}$ is a weighted mix of the computed pixel color (R,G,B)$_{polygon}$ with the fog color (R,G,B)$_{fog}$, according to the pixel visibility value provided by the visibility compute logic unit 112. Fog mixer 120 computes the mixed color according to the equation $$(R,G,B)_{mix} = V*(R,G,B)_{polygon} + (1-V)*(R,G,B)_{fog} \tag{1}$$

The fog mixer 120 output is provided to color buffer 122.

Visibility Compute Logic Unit

Figure 2:
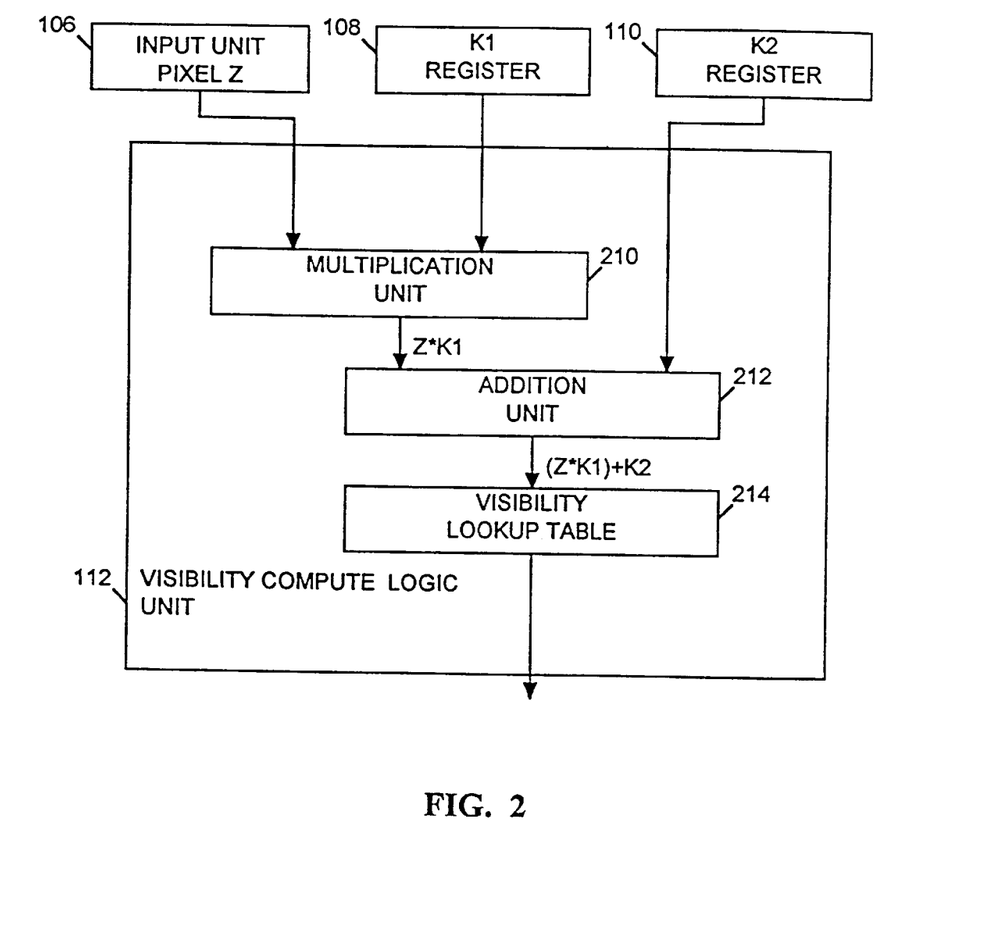
FIG. 2 illustrates a block diagram of visibility compute logic unit 112 according to one embodiment of the present invention.
Figure 3:
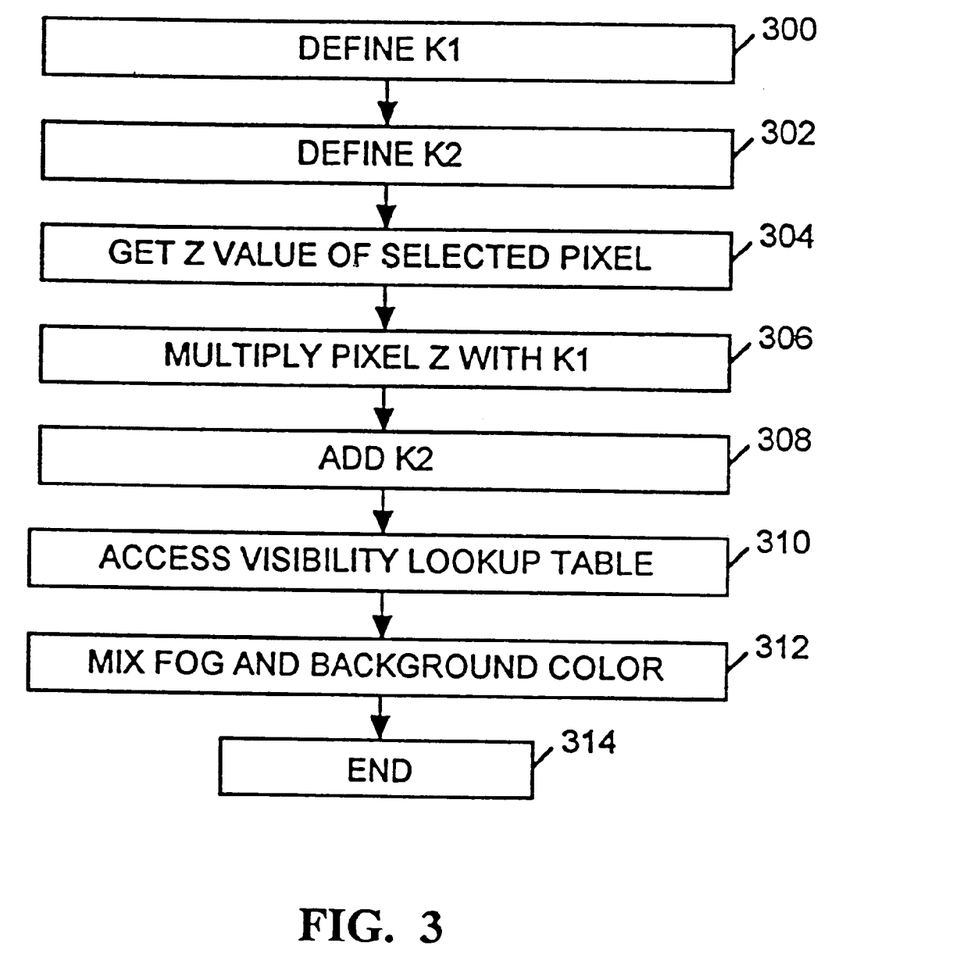
FIG. 3 illustrates a flow chart for generating non-homogenous fog according to one embodiment of the present invention.

FIG. 2 illustrates a block diagram of visibility compute logic unit 112 according to one embodiment of the present invention. Input unit 106 provides the Z depth values at the polygon surface for the processed pixel to visibility compute logic unit 112. In one embodiment, Z, K1 and K2 are represented using 24 bit floating point numbers with one bit for the sign, eight bits for the exponent, and fifteen bits for the floating point fraction. Other embodiments use different numbers floating point fraction bits. K1 register 108 provides the K1 value and K2 register 110 provides the K2 value to visibility compute logic unit 112. K1 is the distance scaling parameter and is proportional to the fog distance, which is the distance at which the visibility is reduced to 37% of the full visibility. K2 is a variable fog parameter. The K2 parameter is derived from the ratio of the fog distance of the "near" fog to that of the "far" fog. K2 is zero for homogenous fog. K2 is negative for non-homogenous fog when the fog density increases with distance. K2 is positive for non-homogenous fog when the fog density decreases with distance. Visibility compute logic unit 112 computes the visibility value of the polygon surface for each processed pixel. The visibility computations use a parametric description of the fog distribution. Two examples of parametric equations which can be used are $$V = e^{K3 - \frac{1}{(K1*Z)+K2}} \quad (2)$$

$$V = e^{K3 - \frac{1}{(K4*K1*Z)+(K4+K2)}} \quad (3)$$

The K3 parameter is a constant that is programmed in the lookup table. The two parameters, K1 and K2, are used to normalize the visibility function. The K4 parameter is a scaling factor applied to K1 and K2 to simplify lookup table address decoding. K1 register 108 and K2 register 110 store the constants K4*K1 and K4*K2 respectively. The derivations of equations (2) and (3) are described below.

In an implementation of equation (2), the Z values are multiplied by the K1 parameter in multiplication unit 210. The Z*K1*K4 product is added to K4*K2 at addition unit 212. This sum is provided to visibility lookup table 214 to generate the visibility value. The output of visibility lookup table 214 is a visibility value for the pixel.

The Visibility Equation

The present invention fog function provides the capability to simulate the visibility effect for homogenous fog and for non-homogenous fog. Fog is non-homogenous when the fog density varies with distance. With homogenous fog, the fog density is constant and the visibility decreases exponentially with distance. The visibility function for homogenous fog is of the form $$V = e^{-density*distance} \quad (4)$$

$$V(D) = e^{-density*D} \quad (5)$$

$$V(Z) = e^{\frac{-1}{K1*Z}} \quad (6)$$

In the homogenous fog function of equation (6), K1=1/density, where K1 is the distance at which the visibility value is V=e$^{-1}$=0.37, and Z=1/D, where D is the distance between the viewpoint and the scene object. The Z image distance is also referred to as RHW (reciprocal homogenous distance in world coordinates). The visibility value ranges from 0.0, when the scene elements are completely hidden by the fog (100% fog contribution), to 1.0, when the scene elements are completely visible (0% fog contribution).

Non-homogenous Fog Overview

For non-homogenous fog, the present invention simulates the effect of fog density that increases with distance, and fog density that decreases with distance. With non-homogenous fog, the visibility decreases with distance, but is contained within two curves. The first curve is the near visibility function. The near visibility function is the visibility function for homogenous fog using the fog density near the viewpoint. The second curve is the far visibility function. The far visibility function is the visibility function for homogenous fog using the fog density beyond the fog distance. The visibility function for non-homogenous fog behaves like the near visibility function near the observer, and like the far visibility function beyond the fog distance. The non-homogenous fog function is of the form $$V(Z) = e^{\frac{-1}{(K1*Z)+K2}} \quad (7)$$

In order to limit the range of the function, a third parameter, K3, is introduced into the non-homogenous fog function. The non-homogenous fog function with the K3 parameter is $$V(Z) = e^{K3 - \frac{1}{(K1*Z)+K2}} \quad (8)$$

To optimize the visibility lookup table, a fourth parameter, K4, is introduced into the non-homogenous fog function. The non-homogenous fog function with the K4 parameter is $$V(Z) = e^{K3 - \frac{K4}{(K4*K1*Z)+(K4+K2)}} \quad (9)$$

In one embodiment, all of the fog conditions are represented by a single visibility function of a normalized and scaled image distance, $Z_{ns}$. $Z_{ns}$ represents the lookup table address. The normalized visibility function is $$V(Z_{ns}) = e^{K3 - \frac{K4}{Z_{ns}}} \quad (10)$$

where $$Z_{ns} = (K4*K1*Z) + (K4*K2) \quad (11)$$

DERIVATION OF THE FOG VISIBILITY FUNCTIONS

The first step in deriving the non-homogenous fog equation is to define the variables and parameters. The input to the visibility function is the image or inverse distance Z. Z is the distance in image space, also referred to as RHW. The distance in image space coordinates is Z=1/D, where D is the distance in three-dimensional space from the observer to the scene element at the sample point.

The following is a list of internal variables that are used to derive the visibility parameters and the visibility function:

fog_distance: The distance at which the visibility is reduced to 37% (V=e$^{-1}$) of full visibility. This is the definition used to derive the relationships between the various fog definition parameters, such as fog_density, fog_start, fog_end, and fog_ratio. The fog distance is the reciprocal of the fog density: fog_distance=1/density.

near_density: Fog density at the viewpoint.

far_density: Fog density at the fog distance.

fog_ratio: The ratio of "near fog" density to "far fog" density. As can be derived from the fog expression for non-homogenous fog, the fog_ratio is actually equal to the square root of the ratio of far_density to near_density where:

$$\frac{far\_density}{near\_density} = (fog\_ratio)^2$$

D: Distance from the observer to the scene element in the 3D space.

$Z_n$: Normalized distance to access the lookup table.

Another way to describe the fog is to use the distance to the limit of visibility. The visibility limit can be defined as the distance where the visibility is reduced to 2% of full visibility. The visibility limit is represented by the variable "vislimit."

The four variables K1 through K4 are introduced to control or scale the visibility function. They are defined as follows:

K1: Distance scaling parameter derived from the fog distance and fog ratio.

K2: Density parameter derived from the fog ratio.

K3: Constant to force the visibility to become 1.0 at a certain close range.

K4: Constant to scale the exponent of the lookup table address.

The variables have the units of distance, inverse of distance, or no units. The units of the variables are as follows:

distance: D, fog_distance, near_distance, vislimit and K1.

inverse distance: Z and fog density no units: $D_n$, $Z_n$, fog_ratio, K2, K3 and K4.

Derivation of the Homogenous Fog Visibility Function

The following describes the derivation of the visibility parameters for the homogenous fog visibility equation. In the subsequent section the parameters for the non-homogenous fog visibility equation are derived using a near visibility function and a far visibility function. The visibility is expressed as a function of Z, where Z=1/D. The expression to compute the visibility, V, for homogenous fog is $$V(Z) = e^{\frac{-1}{K1*Z}} \tag{12}$$

Evaluating the visibility function at the fog distance using the definition of fog distance as the distance where the visibility is reduced to 37% of the full visibility, which is equivalent to $V=e^{-1}$, and solving for K1 yields $$V\left(\frac{1}{fog\_distance}\right) = e^{\left(\frac{-1}{\frac{K1*1}{fog\_distance}}\right)} \tag{13}$$

$$e^{-1} = e^{\left(\frac{-1}{\frac{K1*1}{fog\_distance}}\right)} \tag{14}$$

$$K1 = fog\_distance \tag{15}$$

Thus for homogenous fog the value of the parameter K1 is the fog distance.

Evaluating the homogenous fog equation at the visibility limit, using the definition of visibility limit as the distance where the visibility is reduced to 2% of full visibility yields the following relationships $$V\left(\frac{1}{vislimit}\right) = e^{\left(\frac{-1}{\frac{K1*1}{vislimit}}\right)} = 0.2 \tag{16}$$

$$\ln(V) = -\frac{vislimit}{K1} = \ln(0.2) = -3.91 \tag{17}$$

$$K1 = 0.256 * vislimit \tag{18}$$

$$vislimit = 3.91 * fog\_distance \tag{19}$$

Derivation of the Non-homogenous Fog Visibility Function

The non-homogenous fog generating system of the present invention uses a simplified model that can be derived from the above described implementation of homogenous fog. The visibility function for non-homogenous fog, also called variable fog, is defined with two visibility distances:

near visibility distance (near_distance): "near_distance" defines the fog visibility near the observer. This limit distance is used to define the shape of the visibility function.

fog_distance: The distance at which the visibility is reduced to 37% ($V=e^{-1}$).

As described above, one equation for visibility, V, with non-homogenous fog is $$V(Z) = e^{\frac{-1}{(K1*Z)+K2}} \tag{20}$$

where Z=1/D. For distances near the viewpoint, the distance D is small and Z is very large. D is therefore much less than the fog distance, which is the distance where the visibility is reduced to 37% of full visibility. In the visibility function K1*Z>>K2. The visibility function of equation (20) can therefore be approximated as $$V(Z) = e^{\frac{-1}{K1*Z}} \tag{21}$$

Also, with density at the near distance equal to the density near the viewpoint, the visibility function can be approximated as $$V(Z) = e^{\frac{-1}{near\_distance*Z}} \tag{22}$$

Therefore, K1=near_distance. In this case the normalized distance is defined as $$Z_n = near\_distance * Z = \frac{near\_distance}{D} \tag{23}$$

Substituting the definition of $Z_n$ from equation (23) into equation (22) yields $$V(Z) = e^{\frac{-1}{Z_n}} \tag{24}$$

The variable fog visibility function is then shifted by the offset parameter K2, so that the visibility at the fog distance is 37% of the fill visibility. The normalized distance $Z_n$ is then redefined to include K2 as $$Z_n = near\_distance * Z + K2 \tag{25}$$

Substituting the definition of $Z_n$ from equation (25) into equation (24) yields $$V(Z) = e^{\frac{-1}{near\_distance*Z+K2}} \tag{26}$$

The visibility function can then be written as function of the fog distance as $$V\left(\frac{1}{fog\_distance}\right) = e^{\left(\frac{-1}{\frac{near\_distance}{fog\_distance}+K2}\right)} = e^{-1} \tag{27}$$

$$\frac{near\_distance}{fog\_distance} + K2 = 1 \tag{28}$$

$$K2 = 1 - \frac{near\_distance}{fog\_distance} \tag{29}$$

$$K2 = 1 - fog\_ratio \tag{30}$$

where $$\text{fog\_ratio} = \frac{\text{near\_distance}}{\text{fog\_distance}} \quad (31)$$

Equation (27) can then be evaluated to solve for K1 as a function of fog distance and fog ratio to yield:

$$K1 = \text{fog\_ratio} * \text{fog\_distance} \quad (32)$$

Substituting the definitions of equation (30) and (32) into visibility equation (20) yields $$V(Z) = e^{-\frac{1}{(\text{fog\_ratio} * \text{fog\_distance} * Z) + 1 - \text{fog\_ratio}}} \quad (33)$$

The visibility equation (33) can then be expressed as a function of distance D=1/Z as $$V(D) = e^{-\frac{1}{\left(\frac{\text{fog\_ratio} * \text{fog\_distance}}{D}\right) + 1 - \text{fog\_ratio}}} \quad (34)$$

Figure 4:
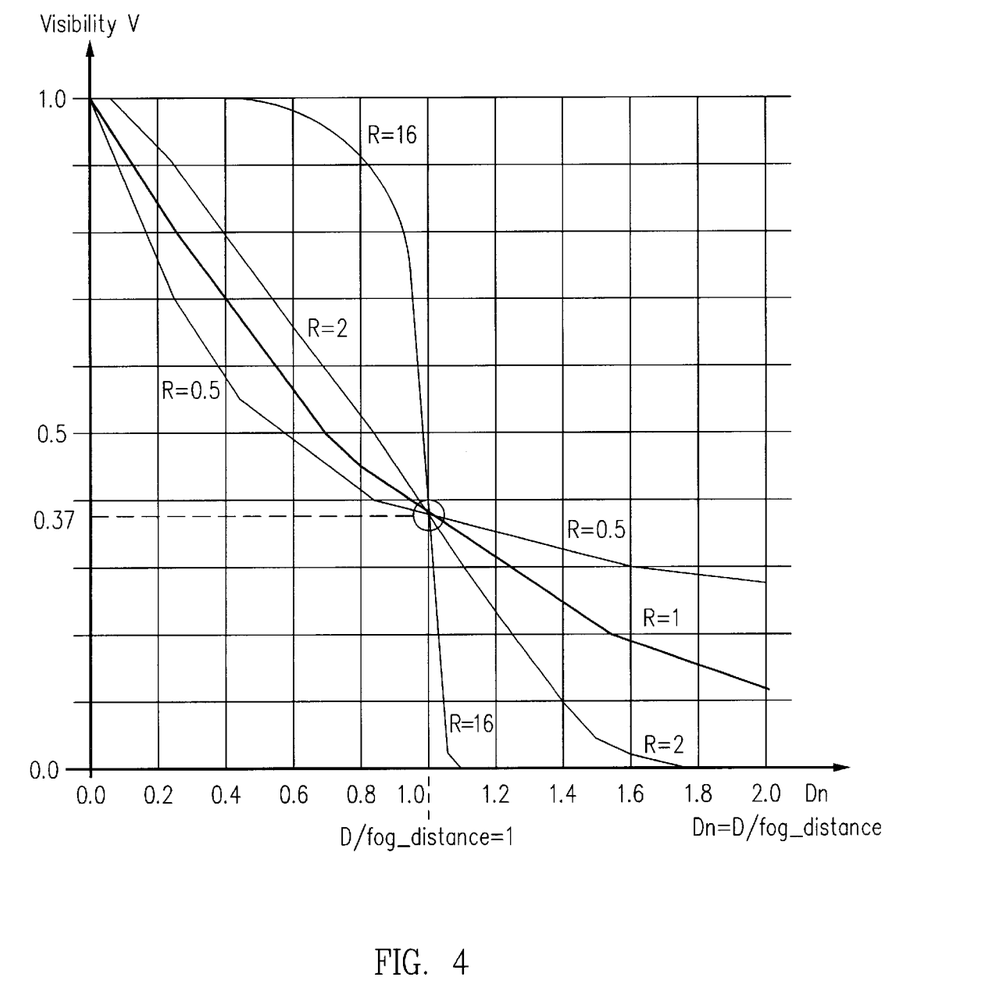
FIG. 4 illustrates plots of a visibility function for several fog ratio, R, values ranging from R=0.5 to R=16.

FIG. 4 illustrates plots of a visibility function for several fog ratio, R, values ranging from R=0.5 to R=16. As illustrated in FIG. 4, the higher the fog ratio value for the visibility curve the more rapidly the visibility changes from full visibility to the lower visibility limit.

VISIBILITY LOOKUP TABLE

In one embodiment, the visibility function is implemented with a lookup table. The lookup table address is derived from a normalized distance so that the same lookup table can be used for all fog conditions. The normalized distance, $Z_n$, is defined as follows:

$$V(Z_n) = e^{-\frac{1}{Z_n}} \quad (35)$$

where $$Z_n = (K1 * Z) + K2 \quad (36)$$

$$V(Z) = e^{-\frac{1}{(K1 * Z) + K2}} \quad (37)$$

To optimize the lookup table access, the visibility function is divided into three ranges with respect to the fog distance.

1. At far distances, when D>>fog_distance, the visibility is V=0.0.
2. At distances around the fog distance, when D≈fog_distance, the visibility values range between 0.0 and 1.0.
3. At near distances, when D<<fog_distance, the visibility is V=1.0.

Two constants, K3 and K4, are introduced to simplify the visibility lookup table access.

Normalized Distance with K3

The constant, K3, is introduced to force the visibility to become 1.0 at a certain close range. Introducing K3 into visibility equation (37) yields $$V(Z) = e^{-\frac{1}{(K1 * Z) + K2} + K3} \quad (38)$$

Visibility equation (38) can then be described as a function of the normalized distance, $Z_n$, as $$V(Z_n) = e^{K3 - \frac{1}{Z_n}} \quad (39)$$

where $$Z_n = (K1 * Z) + K2 \quad (40)$$

The value of K3 is determined in part based upon the accuracy of the lookup table output. For example, in one embodiment the visibility lookup table output consists of a 9 bit fixed point number, and ranges from 0 to 256. The visibility lookup table is accessed only for a limited range. When the lookup table is accessed, the visibility ranges from greater than 0 to 255. When V*256=0, only the fog color is visible and there is no table lookup. When V*256=256, only the polygon color is visible and there is no table lookup. For values of 0<V*256<256, the color of the polygon is mixed with the fog color.

The range of the visibility lookup table is determined based on the desired fog resolution and the system performance constraints. In one embodiment the minimum visibility value is defined to be (0.5/256). Visibility values less than this are set equal to zero. The distance at which the visibility is (0.5/256) is then the maximum distance, $D_{max}$, for the visibility lookup table. The maximum distance corresponds to the minimum $Z_n$ value, $Z_{n\_min}$, of the table. Evaluating visibility equation (39) at $D_{max}$=(0.5/256) yields $$\ln\left(V\left(\frac{1}{D_{max}}\right)\right) = -\frac{1}{Z_{n\_min}} + K3 = \ln\frac{1}{512} = 6.24 \quad (41)$$

$$Z_{n\_min} = \frac{1}{6.24 - K3} \quad (42)$$

$$Z_{n\_min} = 0.160 \quad (43)$$

when K3<<6.24, or $$Z_{n\_min} < 0.160 \quad (44)$$

In one embodiment to simplify the exponent decoding, the value of $Z_{n\_min}$ is defined to be a power of 2.0, and is selected as $Z_{n\_min}$=0.125.

The maximum value of $Z_n$ in the visibility lookup table corresponds to the minimum distance, $D_{min}$<<fog_distance, where the visibility reaches (256/256)=1.0. The constant K3 allows the minimum distance, $D_{min}$, to be defined where the full visibility is reached. In one embodiment the ratio of $D_{max}$ to $D_{min}$ is defined as a power of two as follows:

$$D_{max} = 2^n * D_{min} \quad (45)$$

or $$Z_{n\_max} = 2^n * Z_{n\_min} \quad (46)$$

$$V\left(\frac{1}{D_{min}}\right) = e^{K3 - \frac{1}{Z_{n\_max}}} = 1.0 \quad (47)$$

$$\ln\left(V\left(\frac{1}{D_{min}}\right)\right) = K3 - \frac{1}{Z_{n\_max}} = 0.0 \quad (48)$$

$$Z_{n\_max} = \frac{1}{K3} = 2^n * Z_{n\_min} \quad (49)$$

For example, if $Z_{n\_min}$=0.125=1/8, and $2^n$=256 then K3=1/32.

Introducing K3 modifies the K2 parameter definition in equation (30) as follows:

$$V\left(\frac{1}{fog\_distance}\right) = e^{K3 - \left(\frac{1}{\frac{near\_distance}{fog\_distance} + K2}\right)} = e^{-1} \quad (49.1)$$

$$\frac{near\_distance}{fog\_distance} + K2 = \frac{1}{(K1 * Z) + K2} \quad (49.2)$$

$$K2 = \frac{1}{1 + K3} - \frac{near\_distance}{fog\_distance} \quad (49.3)$$

$$K2 = \frac{1}{1 + K3} - fog\_ratio \quad (49.4)$$

Equation (49.1) is obtained by rewriting equation (38) as a function of 1/fog_distance.

Introducing K3 does not change the definition of K1 in equation (32) which is derived as follows:

$$V\left(\frac{1}{fog\_distance}\right) = e^{K3 - \left(\frac{K1}{\frac{1}{fog\_distance} + K2}\right)} = e^{-1} \quad (49.5)$$

$$\frac{K1}{fog\_distance} + K2 = \frac{1}{1 + K3} \quad (49.6)$$

$$\frac{K1}{fog\_distance} = fog\_ratio \quad (49.7)$$

$$K1 = fog\_distance * fog\_ratio \quad (49.8)$$

Normalized Distance with K4

To simplify the hardware implementation, another constant, K4, is introduced. K4 is used to rescale the parameters K1 and K2. The K parameters are rescaled and redefined as follows. For example, in the IEEE floating point notation, the exponent of 2.0 is equal to 0x80, for an 8 bit exponent. The constants are rescaled so that the maximum distance is represented by the minimum lookup table address equal to 2.0, instead of 0.125. Introducing K4 into visibility equation (38) yields $$V(Z) = e^{K3 - \frac{K4}{(K4 * K1 * Z) + (K4 * K2)}} \quad (50)$$

Visibility equation (50) can then be described as a function of the scaled normalized distance, $Z_{ns}$, as $$V(Z_{ns}) = e^{K3 - \frac{K4}{Z_{ns}}} \quad (51)$$

where $$Z_{ns} = (K4 * K1 * Z) + (K4 * K2) \quad (52)$$

$$K1_s = K4 * K1 = 16 * fog\_ratio * fog\_distance \quad (53)$$

$$K2_s = K4 * K2 = 16 * \left(\frac{1}{1 + K3} - fog\_ratio\right) \quad (54)$$

$$K3 = 1/32 \text{ (for 8 subtables)} \quad (55)$$

$$K4 = \frac{20}{0.125} = 16 \quad (56)$$

$K1_s$ and $K2_s$ are the scaled values of K1 and K2 respectively.

Visibility Lookup Tables Addressing

The lookup table address is a selection of a limited number of bits from $Z_{ns}$. The visibility equation is obtained by substituting the lookup table address ($LUT_{adrs}$) for $Z_{ns}$ in equation (51) using the variable definitions in equations (53)–(56).

$$V(LUT_{adrs}) = e^{K3 - \frac{K4}{LUT_{adrs}}} \quad (57)$$

where $$LUT_{adrs} = K1_s * Z + K2_s \quad (58)$$

$$K1_s = 16 * fog\_ratio * fog\_distance \quad (59)$$

$$K2_s = 16 * \left(\frac{1}{1 + \frac{1}{32}} - fog\_ratio\right) \quad (59.1)$$

$$LUT_{adrs-min} = 2.0, \text{ (exponent = 0x80)} \quad (60)$$

$$LUT_{adrs-max} = 512.0 * (1.0 - 2^{(-6)}) \quad (60.1)$$

where the 6 in the exponent of equation (60.1) represents the number of fraction bits in the address.

After computing the lookup table address, the visibility value is obtained through a lookup table. The lookup table address is a floating point number. There are three cases to consider:

1. The visibility is equal to 0.0 when the sign is negative, or when the exponent is less than 0x80 (8 bit exponent).
2. The visibility is equal to 1.0 when the exponent is greater than 0x87.
3. For exponent values greater than or equal to 0x80 and less than or equal to 0x87, the visibility can have a value between 0.0 and 1.0.

Figure 5:
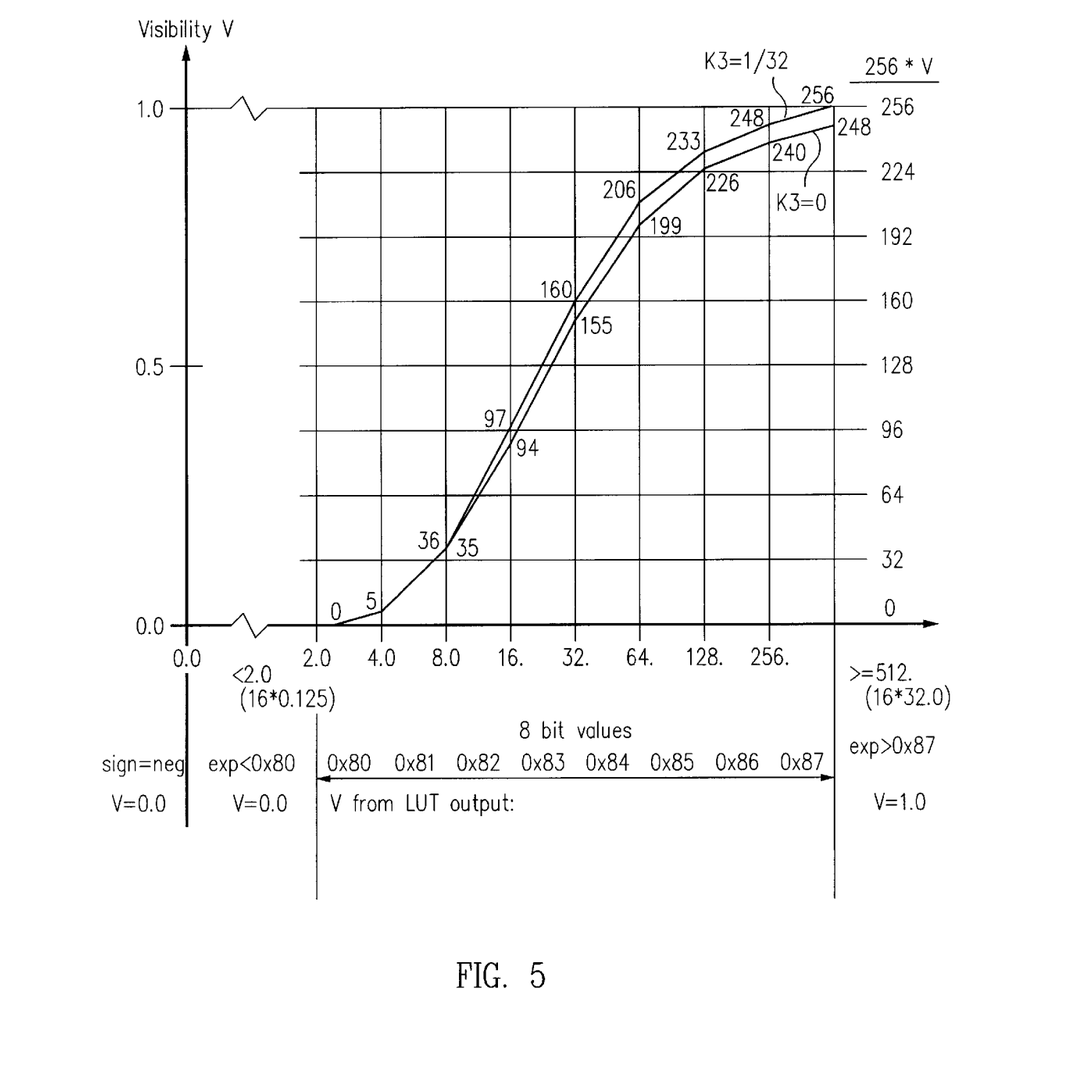
FIG. 5 illustrates a lookup table visibility function for K3=0, and for K3=1/32 according to one embodiment of the present invention.

In a preferred embodiment, the visibility lookup table uses select bits from the floating point address to access the lookup table. Using select bits from the floating point address provides better accuracy and more efficient table access than using a fixed point value. The visibility lookup table is divided into eight subtables. The visibility lookup table uses nine bits of the floating point address. The three least significant bits (LSB) of the exponent are used to select one of the eight subtables. The subtables are addressed with the six most significant bits (MSB) of the floating point fraction. The lookup table visibility function is illustrated in FIG. 5. Two visibility curves are shown, one with K3=1/32 and the other with K3=0. A preferred embodiment uses the function with K3=1/32. The function with K3=0 is shown for comparison purposes. The two curves illustrate how the visibility changes from zero visibility at the start of the lookup table to full visibility at the end of the lookup table. FIG. 5 also shows that the S shaped curve is almost symmetrical and is not exponential. This provides for efficient addressing.

The accuracy of the lookup table can be defined to optimize the efficiency of the system. For increased efficiency, piecewise linear segments for the visibility curve can be used. For a more accurate implementation, a smooth visibility curve can be used.

DERIVATION OF VISIBILITY PARAMETERS

The visibility function for variable fog provides a family of visibility curves that can simulate various fog conditions. For the analysis of the visibility function, normalized distances and normalized fog densities are used.

Normalized Distance

To compare the visibility functions for different values of fog ratio, a normalized distance is defined as follows:

$$D_n = \frac{D}{fog\_distance} = \frac{1}{Z * fog\_distance} \quad (61)$$

The visibility equation $$V(Z) = e^{-\frac{1}{(fog\_ratio * fog\_distance * Z) + 1 - fog\_ratio}} \quad (62)$$

can then be expressed as a function of the normalized variables $Z_n$ and $D_n$ where $$Z_n = fog\_distance * Z \quad (63)$$

$$D_n = \frac{D}{fog\_distance} = \frac{1}{Z_n} \quad (64)$$

Using the definitions of equation (63) and (64) and using R for the fog ratio, the visibility equation (62) becomes $$V(Z_n) = e^{-\frac{1}{(R * Z_n) + 1 - R}} \quad (65)$$

$$V(D_n) = e^{-\frac{1}{\frac{R}{D_n} + 1 - R}} \quad (66)$$

$$V(D_n) = e^{-\frac{D_n}{R + (D_n * (1 - R))}} \quad (67)$$

Figure 6:
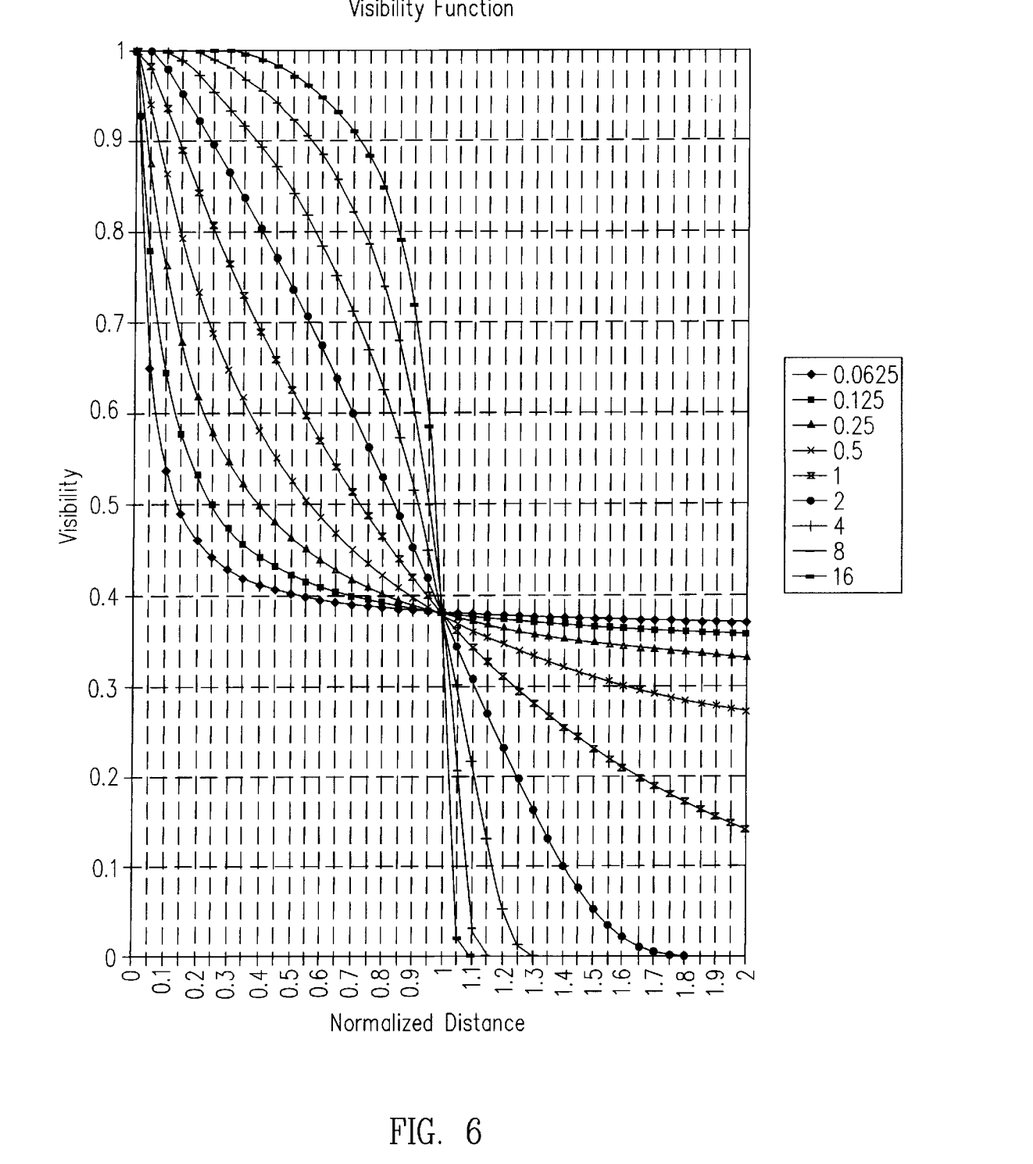
FIG. 6 illustrates visibility functions expressed as a function of normalized distance $D_n$ for several fog ratios ranging from 0.0625 to 16.

Visibility functions expressed as a function of normalized distance $D_n$ for several fog ratios ranging from 0.0625 to 16 are illustrated in FIG. 6.

Fog Density

The fog density, F(D), is equal to the relative decrease in visibility as a function of distance $$F(D) = -\frac{1}{V} * \frac{dV}{dD} \quad (68)$$

The normalized fog density, $F_n$, can be described as a function of normalized distance, $D_n$, as follows:

$$F_n(D_n) = -\frac{1}{V} * \frac{dV}{dD_n} \quad (69)$$

$$F_n(D_n) = \frac{R}{(R + (1 - R) * D_n)^2} \quad (70)$$

Note that when the fog ratio, R, is equal to one, the normalized density is constant $$F_n(R=1)=1 \quad (71)$$

or, according to the fog distance definition $$F(R = 1) = \frac{1}{fog\_distance} \quad (72)$$

$$F_n = F * fog\_distance \quad (73)$$

Equation (72) is based upon the definition of fog distance being the inverse of fog density.

There are three reference points on the density curve that clarify the meaning of fog ratio.

(1) Fog density at the viewpoint: $D_n$=0 and $F_n$=(1/fog_ratio).

(2) Fog density at the fog distance: $D_n$=1 and $F_n$=fog_ratio.

(3) The normalized distance at which the normalized density is unity.

Based on the first two relationships, the normalized fog density ratio between $D_n$=1 and $D_n$=0 is equal to the square of the fog ratio $$\frac{F_n(D_n = 1)}{F_n(D_n = 0)} = (fog\_ratio)^2 \quad (74)$$

Beyond the fog distance the fog density behaves as follows: it is equal to the fog ratio for homogeneous fog (constant density); it is greater than the fog ratio when the fog density increases with distance; and it is smaller than the fog ratio when the fog density decreases with distance.

The normalized distance for $F_n(D_n)$=1 is obtained as follows:

$$D_n(F_n = 1) = \frac{R - \sqrt{R}}{R - 1} \quad (75)$$

Values of normalized distance ($D_n$) at which the normalized density ($F_n$) is unity, as a function of the fog ratio, R, are shown in Table 1.

TABLE 1

| Fog ratio | $D_n(F_n = 1)$: |
|---|---|
| 0.0625 | 0.2 |
| 0.125 | 0.261 |
| 0.25 | 0.333 |
| 0.50 | 0.414 |
| 1.0 | 0.5 |
| 2.0 | 0.586 |
| 4.0 | 0.667 |
| 8.0 | 0.73 |
| 16.0 | 0.8 |

Figure 7:
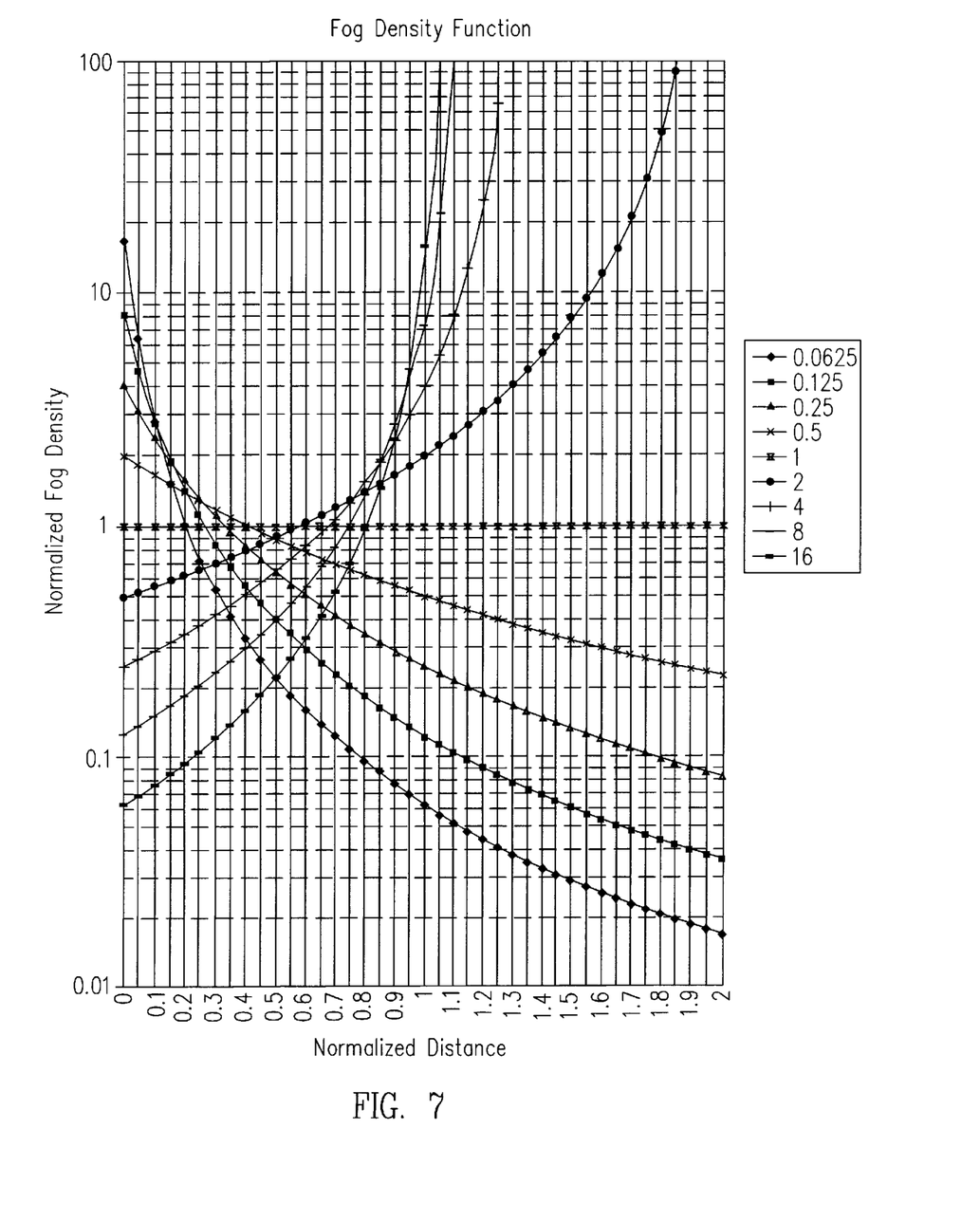
FIG. 7 illustrates the fog density as a function of normalized distance for fog ratios ranging from 0.0625 to 16.

FIG. 7 illustrates the fog density as a function of normalized distance for fog ratios ranging from 0.0625 to 16.

Fog Specified with Start and End Points

The present invention can be used to implement the exponential fog functions in API's such as, for example, Microsoft's Direct3D™ and Silicon Graphics' OpenGL. The present invention can also be used to implement exponential squared fog functions and linear fog functions in such API's as described in the following sections.

For linear fog, the visibility is defined by a start point and an end point. Linear visibility curves can be approximated by variable fog functions. The relationship assumes that at the fog distance, the normalized fog density is equal to the fog ratio. The relationship further assumes that the slope of the linear visibility function at the fog distance is equal to the slope of the variable fog function. The equation for the normalized fog density is $$F_n(D_n) = -\frac{1}{V_n} * \frac{dV_n}{dD_n} \quad (76)$$

At the fog distance the normalized fog density equation is $$F_n(1) = -\frac{1}{V_n} * \frac{dV_n}{dD_n} = fog\_ratio \qquad (77)$$

The equations for the fog density at the fog distance are:

$$F(fog\_distance) = -\frac{1}{V} * \frac{dV}{dD} = \frac{fog\_ratio}{fog\_distance}, \text{ or} \qquad (78)$$

$$F(fog\_distance) = -\frac{1}{V} * slope = \frac{fog\_ratio}{fog\_distance} \qquad (78.1)$$

$$slope(fog\_distance) = \qquad (79)$$
$$-V * \frac{fog\_ratio}{fog\_distance} = -0.37 * \frac{fog\_ratio}{fog\_distance}$$

The visibility function within a range around the fog distance can be approximated by a segment of a line, with values between zero and one, with the following equation:

$$V1(D) = 0.37\left(1 - \left((D - fog\_distance) * \frac{fog\_ratio}{fog\_distance}\right)\right) \qquad (80)$$

Figure 8:
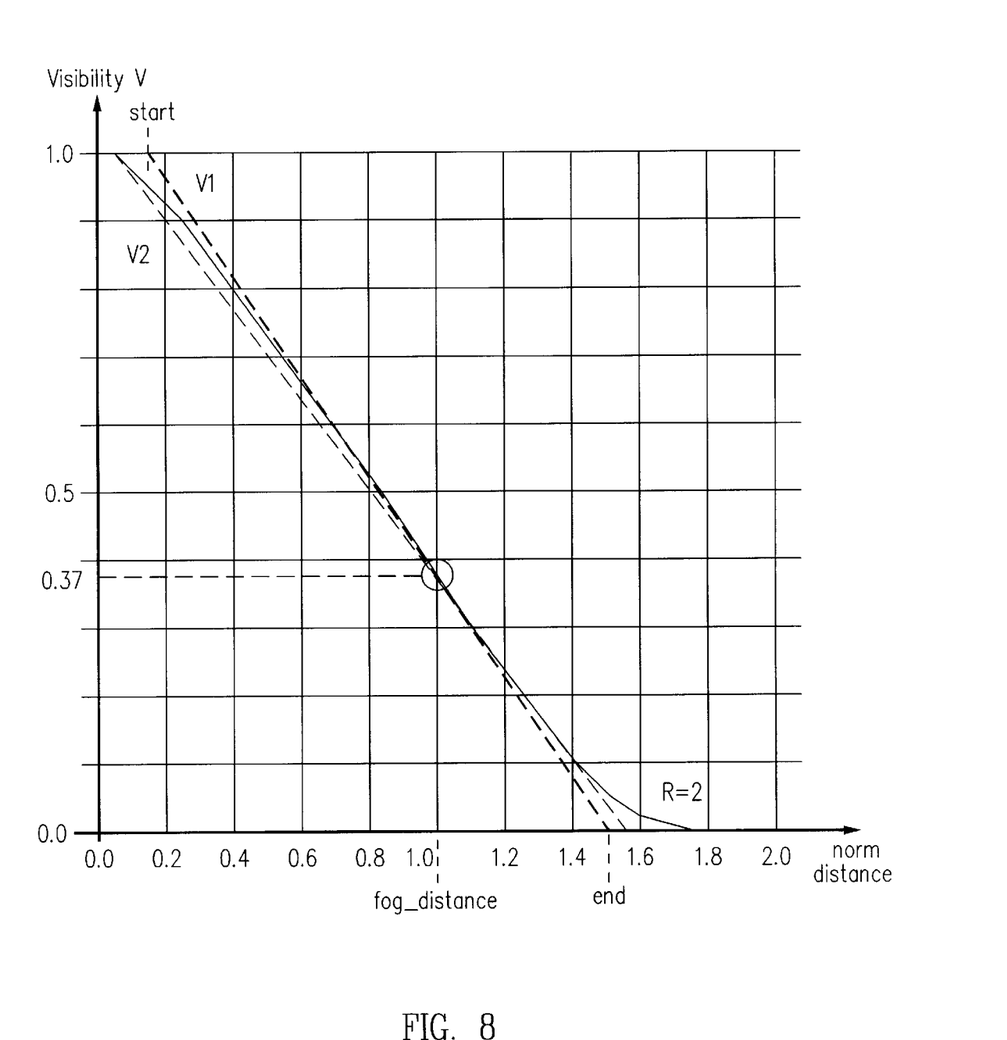
FIG. 8 illustrates an example of a linear visibility function.

FIG. 8 illustrates an example of a linear visibility function. In this example, the visibility curve used to match the start and end values has a fog ratio, R=2.

For the linear visibility function V1(D), equation (80), the line slope is equal to slope(fog_distance), and the visibility is V1=0.37 at the fog distance. In addition, the visibility V1=1 at the start point and V1=0 at the end point.

$$V1(start) = 0.37 * \left(1 - \left((start - fog\_distance) * \frac{fog\_ratio}{fog\_distance}\right)\right) = 1 \qquad (81)$$

$$V1(fog\_distance) = 0.37 \qquad (82)$$

$$V1(end) = 0.37 * \left(1 - \left((end - fog\_distance) * \frac{fog\_ratio}{fog\_distance}\right)\right) = 0 \qquad (83)$$

The fog distance and fog ratio can be computed from the start and end distances as follows:

$$fog\_distance = (0.63 * end) + (0.37 * start) \qquad (84)$$

$$fog\_ratio = \frac{(1.7 * end) + start}{end + start} \qquad (85)$$

A better fit can be obtained by using a slightly smaller slope. The modified slope is obtained by multiplying the fog ratio by the parameter K5. In one embodiment, K5 is set equal to 0.9.

$$V2(D) = 0.37 * \left(1 - \left((D - fog\_distance) * K5 * \frac{fog\_ratio}{fog\_distance}\right)\right) \qquad (86)$$

The fog distance and fog ratio can be computed for equation (86) from the start and end distances as follows:

$$fog\_distance = (0.63 * end) + (0.37 * start) \qquad (87)$$

$$fog\_ratio = 1.1 * \frac{(1.7 * end) + start}{end + start} \qquad (88)$$

The numerical values in the equations are provided as illustrative examples. As is known by those of ordinary skill in the art, these values can be modified to modify the fog effects generated.

Exponential Fog Function

The exponential fog function that represents homogenous fog is $$V = e^{-density * distance} \qquad (89)$$

An exponential fog function can be generated with the present invention by defining K1=fog_distance, and K2=0.

Exponential Squared Fog Function

For the exponential squared fog function, the visibility function is $$V = e^{-(density * distance)^2} \qquad (90)$$

The exponential squared fog function can be approximated with the function for variable fog using a fog distance and fog ratio defined as follows:

$$fog\_distance = \frac{1}{density} \qquad (91)$$

$$fog\_ratio = 1.6 \qquad (92)$$

Figure 9:
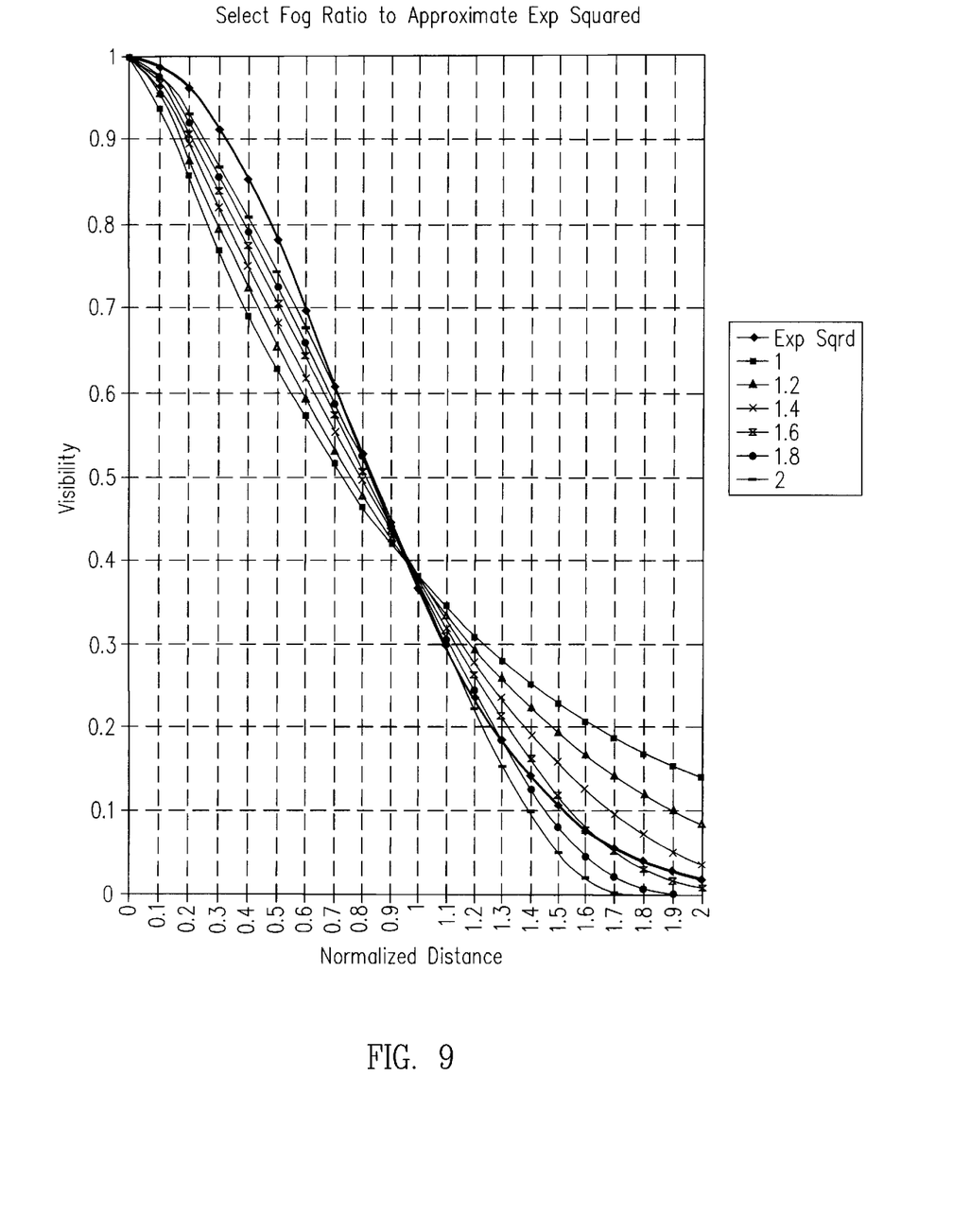
FIG. 9 illustrates an exponential squared function and also variable fog visibility function curves for several fog ratio values ranging from 1.0 to 2.0.

The fog ratio value of 1.6 is derived from a comparison of the exponential squared function and the visibility functions with fog ratio values ranging from 1.0 to 2.0. The exponential squared function and the visibility functions for several fog ratio values ranging from 1.0 to 2.0 are illustrated in FIG. 9.

Per Vertex Fog

As described above, in pixel based fog generating methods a visibility value is computed for a selected pixel based on the distance of the position of the pixel in 3D space to the viewpoint. In per vertex fog generating methods, visibility values are first computed at the vertices of the polygons used to model 3D surfaces. A visibility value for a pixel is then interpolated from the visibility values of the corresponding polygon. As is known by those of ordinary skill in the art this interpolation can be performed by the system hardware in a manner similar to the RGB color component interpolation. The present invention fog generation methods can thereby be implemented to compute the visibility values of polygon vertices in per vertex fog generating methods.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the values of constants used in the visibility functions can be modified and further fog modification parameters can be added to the visibility functions.

What is claimed is:

1. A method of generating linear fog effects in an image on a display using a computer system comprising the steps of:

defining a start position for a linear fog model;
defining an end position for said linear fog model;
computing a fog distance, wherein said fog distance is a distance from a first reference position to a second reference position at which visibility is a predetermined value, said fog distance being equal to (0.63*end position)+(0.37*start position);

determining a fog ratio comprising a ratio of a fog density at said first reference position to a fog density at said second reference position beyond the fog distance;

computing a distance, D, from a sample point on an object to be displayed, to said first reference position;

determining a visibility value at said sample point, wherein said visibility value is equal to $$0.37 * \left(1 - \left((D - \text{fog distance}) * K5 * \frac{\text{fog ratio}}{\text{fog distance}}\right)\right)$$

wherein K5 is a curve fitting parameter;

mixing a fog color and a background color to obtain a pixel color based on at least one of said visibility values.

2. The method of claim 1 wherein said step of determining a fog ratio comprises computing a fog ratio equal to $$\frac{1}{K5} * \frac{(1.7 * \text{end position}) + \text{start position}}{\text{end position} + \text{start position}}$$

3. The method of claim 2 wherein K5 approximately equal to 0.9.

4. The method of claim 1 further comprising the step of interpolating a visibility value for a pixel based upon visibility values from a plurality of sample points.

* * * * *